(12) United States Patent
Lonsinger et al.

(10) Patent No.: US 7,699,270 B2
(45) Date of Patent: Apr. 20, 2010

(54) WING, ESPECIALLY A CARRIER WING OF AN AIRPLANE, HAVING AN ADAPTABLE PROFILE

(75) Inventors: Hans Lonsinger, Langenau-Albeck (DE); Juan Perez-Sanchez, Bad-Aibling (DE)

(73) Assignee: Airbus Deutschland GmbH, Hamburg (DE)

( * ) Notice: Subject to any disclaimer, the term of this patent is extended or adjusted under 35 U.S.C. 154(b) by 554 days.

(21) Appl. No.: 10/559,861

(22) PCT Filed: Jun. 7, 2004

(86) PCT No.: PCT/DE2004/001191

§ 371 (c)(1),
(2), (4) Date: Dec. 6, 2005

(87) PCT Pub. No.: WO2004/110861

PCT Pub. Date: Dec. 23, 2004

(65) Prior Publication Data

US 2006/0145029 A1     Jul. 6, 2006

(30) Foreign Application Priority Data

Jun. 7, 2003    (DE) .................................. 103 25 950

(51) Int. Cl.
*B64C 3/44* (2006.01)
(52) U.S. Cl. .................................................... 244/219
(58) Field of Classification Search ................. 244/219, 244/211–216, 75.1
See application file for complete search history.

(56) References Cited

U.S. PATENT DOCUMENTS

| | | | |
|---|---|---|---|
| 4,053,124 A | 10/1977 | Cole | |
| 4,247,066 A | 1/1981 | Frost et al. | |
| 4,351,502 A | 9/1982 | Statkus | |
| 4,427,169 A | 1/1984 | Brown | |
| 4,429,844 A | 2/1984 | Brown et al. | |
| 5,114,104 A | 5/1992 | Cincotta et al. | |
| 5,350,135 A * | 9/1994 | Renzelmann et al. | 244/49 |
| 5,839,698 A | 11/1998 | Moppert | |
| 5,887,828 A | 3/1999 | Appa | |
| 6,010,098 A * | 1/2000 | Campanile et al. | 244/219 |
| 6,076,775 A | 6/2000 | Bauer | |
| 6,644,599 B2 * | 11/2003 | Perez | 244/219 |

FOREIGN PATENT DOCUMENTS

| | | |
|---|---|---|
| DE | 199 36 721 | 2/2001 |
| EP | 1 205 383 | 5/2002 |
| WO | WO 02/47976 | 6/2002 |

* cited by examiner

*Primary Examiner*—Timothy D Collins
*Assistant Examiner*—Michael Kreiner
(74) *Attorney, Agent, or Firm*—W. F. Fasse; W. G. Fasse (57) ABSTRACT

A wing has a changeable profile, and extends in a wing chord direction and perpendicularly thereto in a wingspan direction. The wing has a first cover skin and a second cover skin spaced apart from one another with spars therebetween. The wing includes a leading edge region and a trailing edge region opposite one another in the wing chord direction, and a wing tip region at the end of the wing in the wingspan direction. The wing further includes a flexible region that connects the wing tip region to the rest of the wing, and that is adapted to vary the profile of the wing in a direction that includes a component in the wing chord direction and a component in the wingspan direction.

28 Claims, 7 Drawing Sheets

WING, ESPECIALLY A CARRIER WING OF AN AIRPLANE, HAVING AN ADAPTABLE PROFILE

The invention relates to a wing, especially a carrying or lifting wing of an aircraft, with a changeable profile.

BACKGROUND INFORMATION

In aircraft, especially in high performance aircraft, there is a striving to embody the areas or regions of the wing that are used for the controlling and/or trimming of the aircraft so that on the one hand the guidance of the flow on the wing is aerodynamically as advantageous as possible, and on the other hand the arising loads are distributed as uniformly as possible.

SUMMARY OF THE INVENTION

It is therefore the object of the invention to provide a wing, especially a carrying wing or lifting wing of an aircraft, with a changeable profile, which is as optimal as possible with respect to aerodynamics and load distribution.

Preferably, the wing with changeable profile shall be suitable for optimizing the lift distribution (trimming), but also for the roll control, and in the latter case, shall thus replace conventional ailerons.

The above object has been achieved according to the invention in a wing with a changeable wing profile, the wing comprising a leading edge region and a trailing edge region opposite one another with respect to a wing chord direction, a first cover skin and a second cover skin spaced apart from one another by spars therebetween, a wing tip region at an end of the wing with respect to a wingspan direction, and a flexible region by which the wing tip region is connected with a remainder of the wing and by which the wing profile of the flexible region is adjustable in a direction that includes both a first component in the wing chord direction and a second component in the wingspan direction, characterized in that the flexible region comprises several longitudinally extending torsion boxes that are arranged next to one another and that are each respectively formed of the first cover skin, the second cover skin and at least one of the spars, and further comprising an adjusting mechanism adapted to change a shape of the torsion boxes and therewith of the wing profile in response to a corresponding control signal, wherein the wing tip region comprises an end piece arranged and adapted to permit a compensation of a mutual relative sliding displacement of the first cover skin relative to the second cover skin with a change of a curvature or camber of the flexible region due to the change of the shape of the torsion boxes.

BRIEF DESCRIPTION OF THE DRAWINGS

In the following, example embodiments of the invention are explained in connection with the drawing. It is shown by.

DETAILED DESCRIPTION OF EXAMPLE EMBODIMENTS OF THE INVENTION

Figure 1:
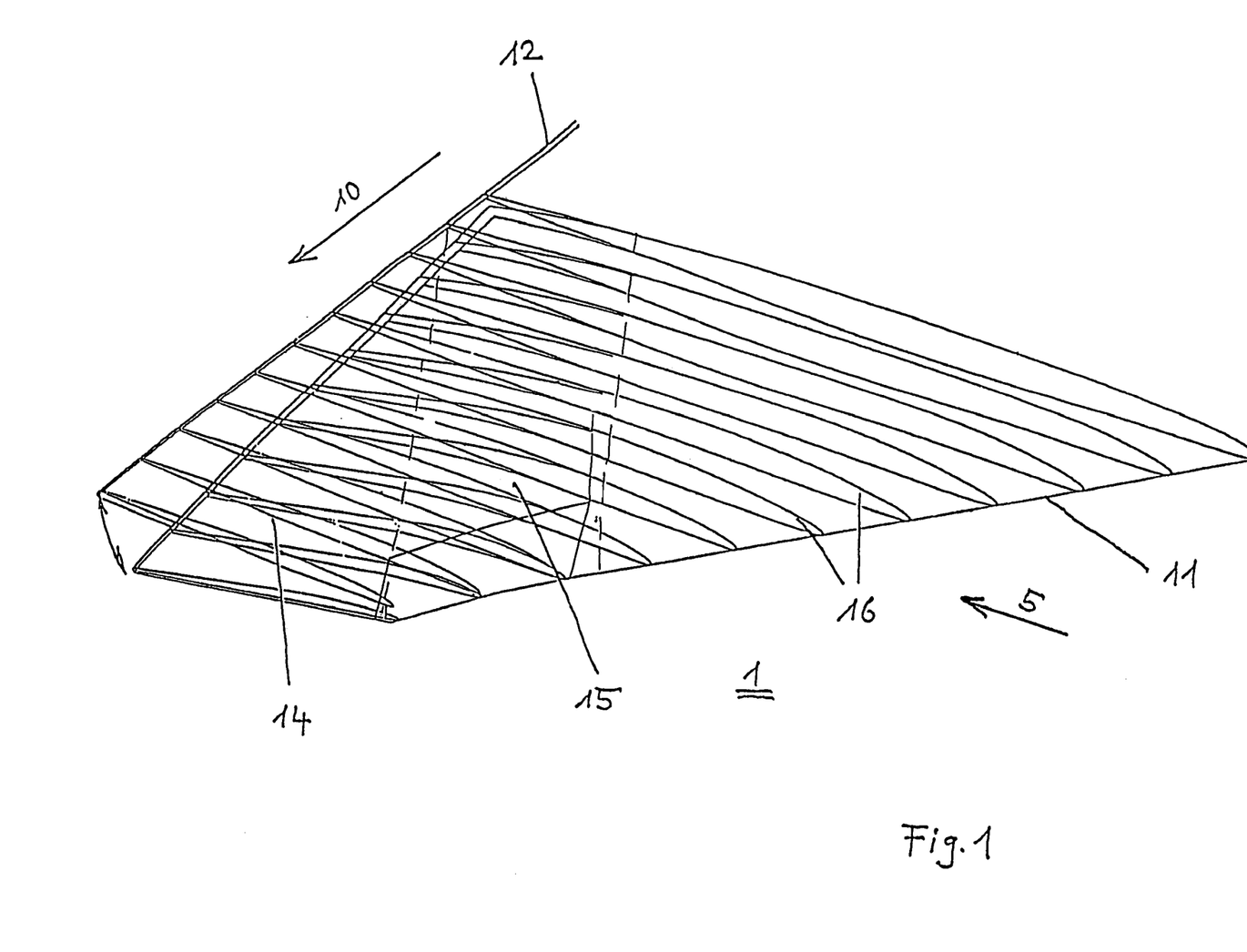
FIG. 1 a perspective schematic view of a lifting wing of an aircraft with changeable profile, in which a wing tip region is adjustable via a flexible region in a direction that includes both a component in the wing chord direction as well as a component in the wingspan direction.

The perspective illustration of the FIG. 1 shows a lifting wing 1 of an aircraft, namely of a high performance aircraft, with a changeable profile. The arrow referenced with the reference number 5 means the wing chord direction, which extends essentially in the flow direction, and the arrow referenced with the reference number 10 means the wingspan direction extending crosswise or perpendicularly thereto. The profile sections 16 shown in FIG. 1 extend parallel to the wing chord direction 5. With reference to the wing chord direction 5, there is a leading edge region 11 and a trailing edge region 12, and with reference to the wingspan direction 10, there is a wing tip region 14 at the end of the wing 1.

The wing tip region 14 is connected with the rest of the wing 1 via a flexible region 15, and is adjustable in a direction that includes both a component in the wing chord direction 5 as well as a component in the wingspan direction 10. As can be seen in FIG. 1, the flexible region 15 extends obliquely relative to the wing chord direction 5 from the leading edge region 11 to the trailing edge region 12 of the wing 1; and is arranged essentially perpendicularly to the leading edge region 11, which exhibits a marked positive sweepback angle relative to the wing chord direction 5.

The wing 1 has a first covering or cover skin 55a, namely on its upper side or surface, and a second covering or cover skin 55b lying opposite the first cover skin, namely on its bottom side or surface. In the flexible region 15, the curvature or camber of the wing 1 is adjustable while changing the curvature of the first cover skin 55a and of the second cover skin 55b, whereby both cover skins 55a, 55b exhibit an essentially smooth continuous extension or contour independent of the adjustment.

Figure 2:
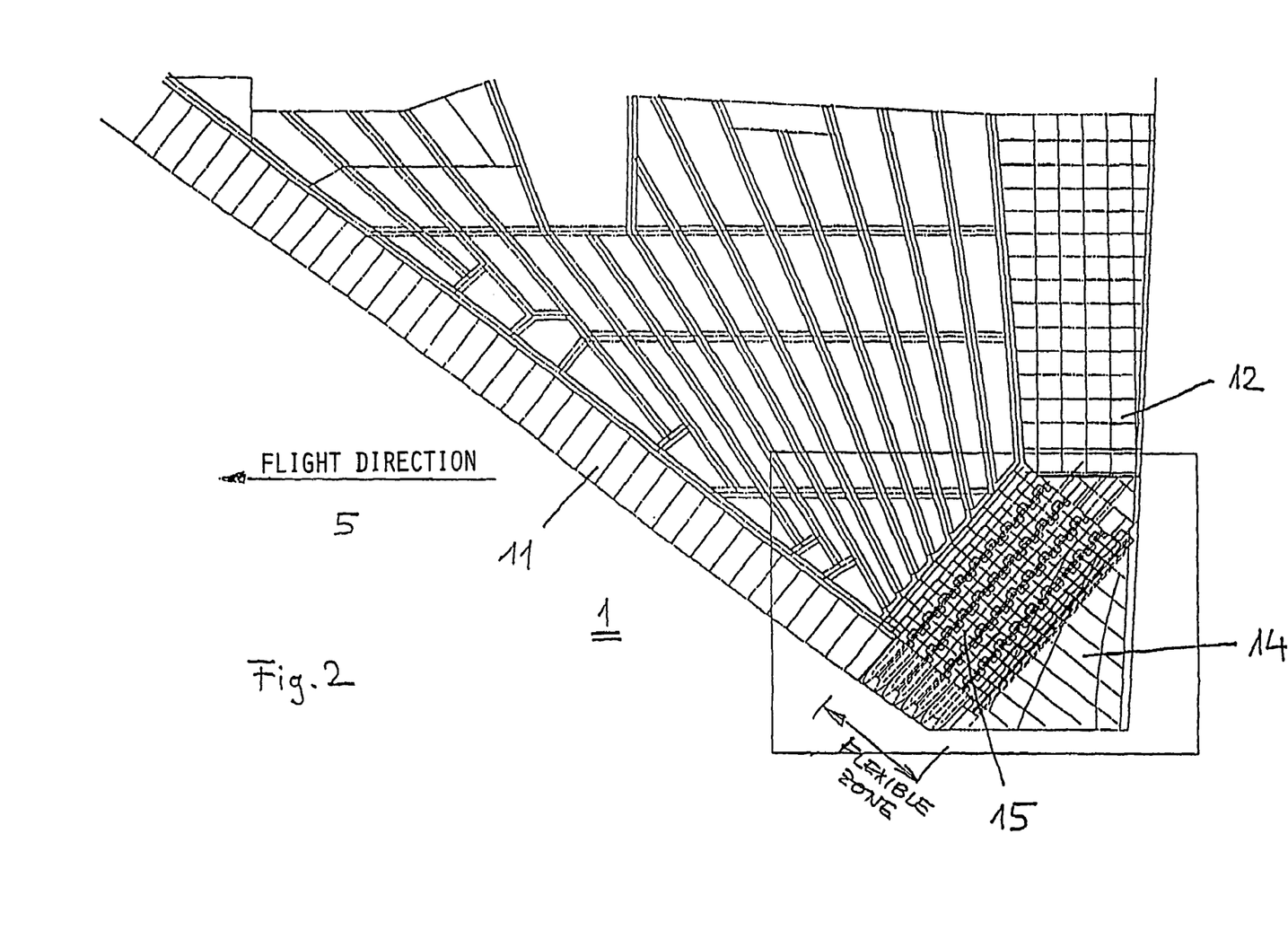
FIG. 2 a top plan view onto the wing shown in FIG. 1.
Figure 3:
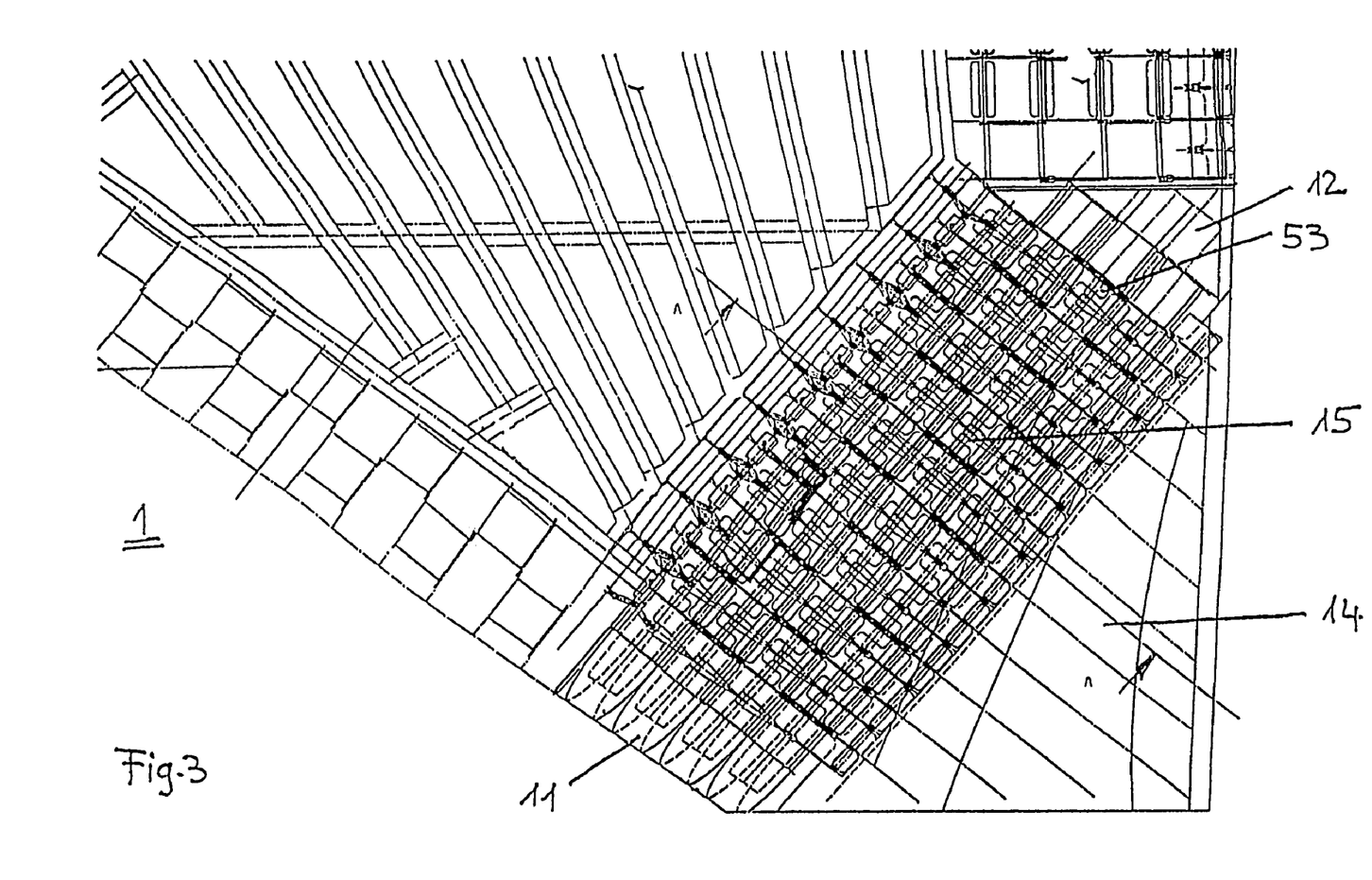
FIG. 3 an enlarged illustration of the flexible region characterized in FIG. 2.

In the top plan view onto the wing 1 illustrated in FIG. 2, the position of the flexible region 15 is shown more closely, which is shown further enlarged in FIG. 3.

Figure 4:
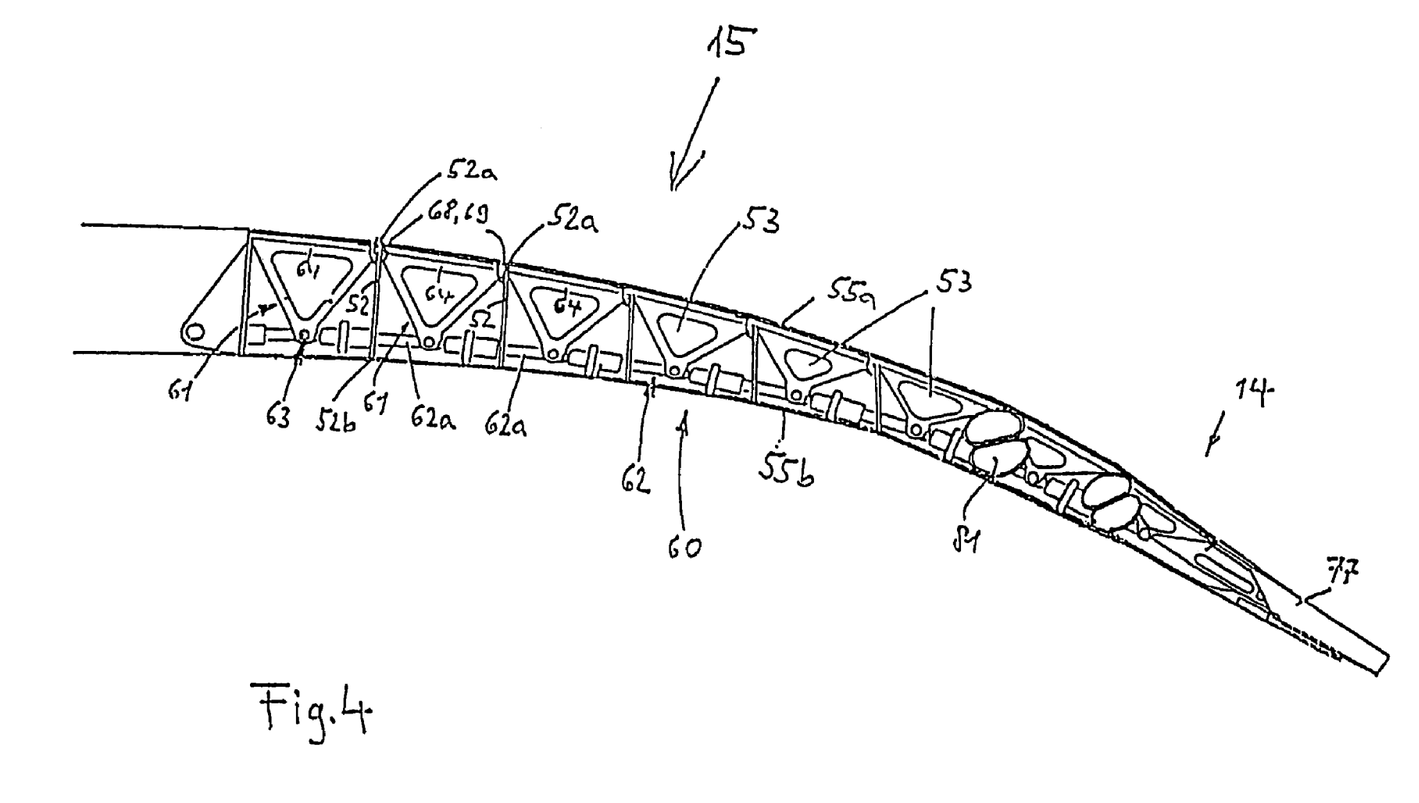
FIG. 4 a section through the flexible region and the wing tip region of the lifting wing shown in the FIGS. 1 to 3 according to a first example embodiment of the invention.

As can be seen in FIG. 3, the flexible region 15 comprises several longitudinally extending torsion boxes 53 arranged next to one another, which extend with their longitudinal direction from the leading edge region 11 to the trailing edge region 12 of the wing 1, thus perpendicularly to the curvature direction of the flexible region 15. As shown by FIG. 4, the torsion boxes 53 are formed of the first cover skin 55a, the second cover skin 55b as well as at least one spar 52 extending in the longitudinal direction of the torsion boxes 53, and are articulately or jointedly connected with one another to a prescribed degree. The torsion boxes 53 are torsionally stiff about their longitudinal direction, yet are changeable or variable in their form or shape, in the sense of a prescribed change of the wing profile, in a direction perpendicular thereto.

An adjusting or actuating mechanism referenced overall with the reference number 60 serves for the changing or varying of the shape or form of the torsion boxes 53, that is to say of the cross-section thereof perpendicular to their longitudinal extension, and therewith of the wing profile in response to a corresponding externally supplied control signal. In detail, the adjusting mechanism 60 includes at least one, and in the example embodiment illustrated in FIGS. 3 and 4 a plurality of swivel bodies or vertebra bodies 61, namely a number of swivel bodies or vertebra bodies 61 that are provided arranged one behind another in the respective torsion boxes 53, as well as respectively a number of swivel bodies or vertebra bodies 61 next to one another in each one of the individual torsion boxes 53.

The vertebra bodies 61 respectively comprise a transmission element 64, which is connected via a pendulum or pivot joint 68 with the first cover skin 55*a* in order to compensate or even-out a relative motion between the first upper cover skin 55*a* and the vertebra body 61, and, spaced apart in the vertical direction, a connection location 63 to a drive chord, tendon or line 62*a* that is adjustable or changeable in its length in response to the control signal.

As can be seen from FIG. 4, each vertebra body 61 in a cross-section has an essentially triangular basic shape, whereby the upper side of the triangle extends essentially parallel to the first upper cover skin 55*a* and forms the transmission element 64, and the bottom corner or peak of the triangle forms the connection location 63 coupled with the drive chord or line 62*a*. Thus, a change of the length of the drive line 62*a* leads to a rotation or twisting of the vertebra body 6l in the sense of a change of the (cross-sectional) shape of the torsion boxes 53, and thus to a change of the wing profile, as is desired. The cooperation of the vertebra bodies 61 and of the drive lines 62*a* leads to a change of the curvature of the adjusting mechanism 60 formed thereby, as is similar to the change of the curvature in the spinal column of a mammal, for which reason the term "vertebra body" or "vertebra" is used for the components used with the reference number 61. For the purpose of a further disclosure of the basic principle underlying the adjusting mechanism 60, reference is made to the earlier German Patent Application DE 10055961.1-22, also see the related EP 1,205,383 and U.S. Pat. No. 6,644,599.

The vertebra or swivel bodies 61 arranged one behind another are respectively connected with one another via a vertebra or swivel joint 69. At the end of the wing tip region 14, there is provided an end piece 77, at which there occurs a compensation of a mutual relative sliding displacement of the first upper cover skin 55*a* relative to the second lower cover skin 55*b* with a change of the curvature or camber of the flexible region 15 due to the deformation of the torsion boxes 53. For that purpose, the second lower cover skin 55*b* is slidably supported against the end piece 77, whereby simultaneously means are provided, by which the cover skin is reliably held onto the end piece 77 in each adjustment position. Alternatively, a compensation of the mutual relative sliding displacement can also take place at a different location.

The pendulum or pivot joint 68 in the example embodiment illustrated in FIG. 4 is embodied as an elastic joint, in which the transmission element 64 of each respective vertebra body 61 is connected via an elastic connection on the one hand with the first cover skin 55*a* and on the other hand with the associated spar 52. In the illustrated example embodiment, the arrangement of vertebra body 61 and drive line 62*a* is provided respectively within the torsion boxes 53, alternatively this can also be provided outside of the same.

Figure 5:
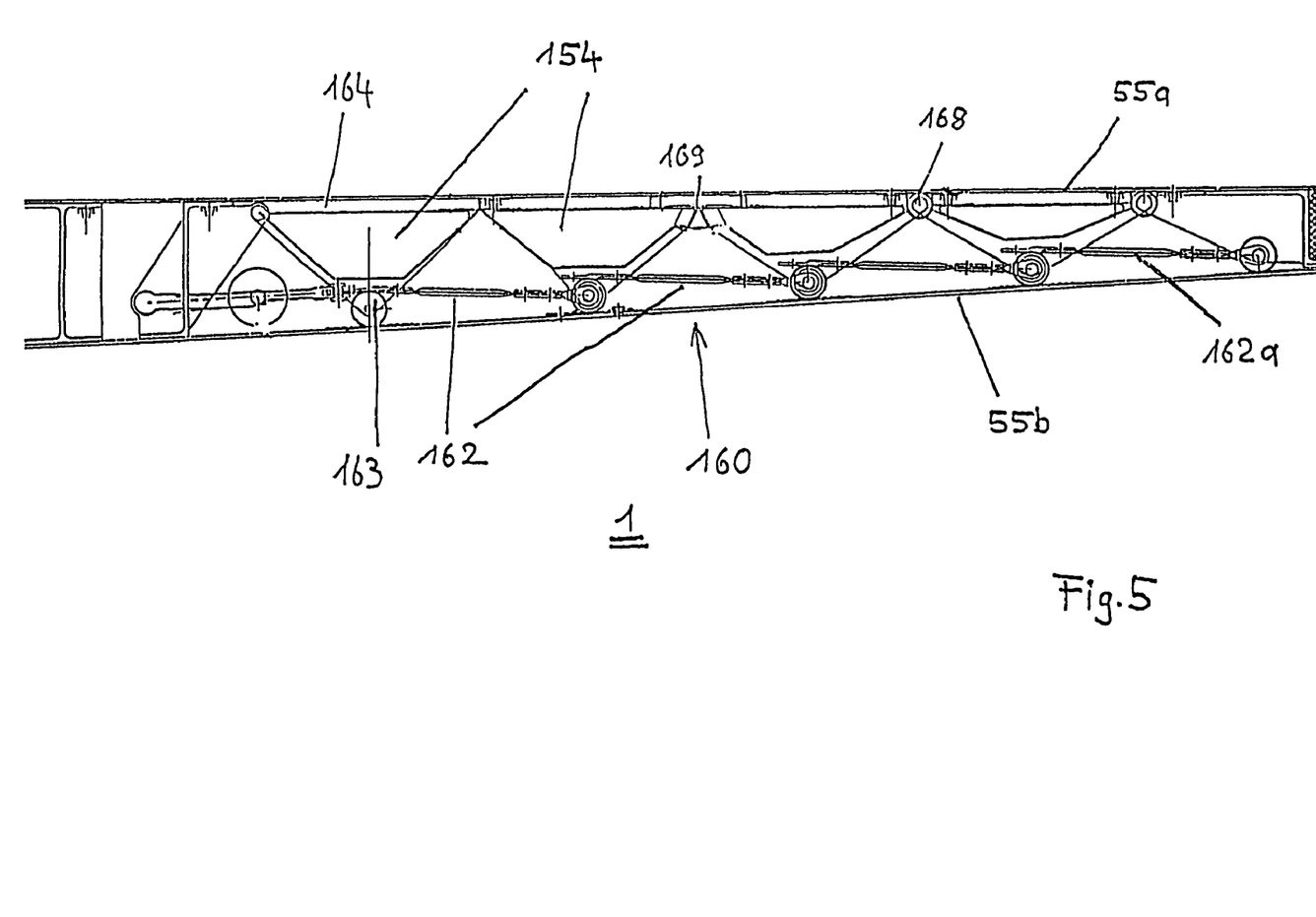
FIG. 5 a section through the flexible region of a lifting wing according to a further example embodiment of the invention, in which the flexible region is formed by several box elements that are extended or elongated in a longitudinal direction and arranged between the first cover skin or covering and the second cover skin or covering of the wing.

In FIG. 5, a further example embodiment of the invention is illustrated.

As shown by the cross-sectional view of FIG. 5, the flexible region 11; 12; 15 comprises several box elements 154, which are connected articulately or jointedly in a prescribed degree at their longitudinal sides at joint regions 169, and are provided between the first cover skin 55*a* and the second cover skin 55*b*. The box elements 154 are elongated or extended in a longitudinal direction extending perpendicularly to the plane of the drawing in FIG. 5, and have an essentially triangular basic shape in cross-section.

The box elements 154 are connected with the first cover skin 55*a* at a transmission region 164, which is formed by the upper base line of the mentioned triangle, and they have, spaced apart in the vertical direction, a connection region 163, which is formed by the corner or peak of the triangle located opposite the baseline, and which is coupled with an adjusting or actuating mechanism referenced overall with the reference number 160, which serves to pivot or tilt the box elements 154 about the joint regions 169 in the sense of a change of the wing profile in response to a corresponding control signal.

The adjusting mechanism 160 comprises a respective drive line 162*a*, that is changeable in its length and that is coupled with the connection region 163 of the box elements 154, whereby a change of the length of the drive line 162*a* causes a rotation of the box elements 154 in the sense of a change of the form or shape of the wing profile. The box elements 154 arranged one behind another are respectively coupled with a drive line 162*a*.

Pendulum or pivot joints 168, which are coupled between the transmission region 164 of the box elements 154 and the first cover skin 55*a* serve for compensating or evening-out a relative motion between the first cover skin 55*a* and the box element 154.

Figure 6:
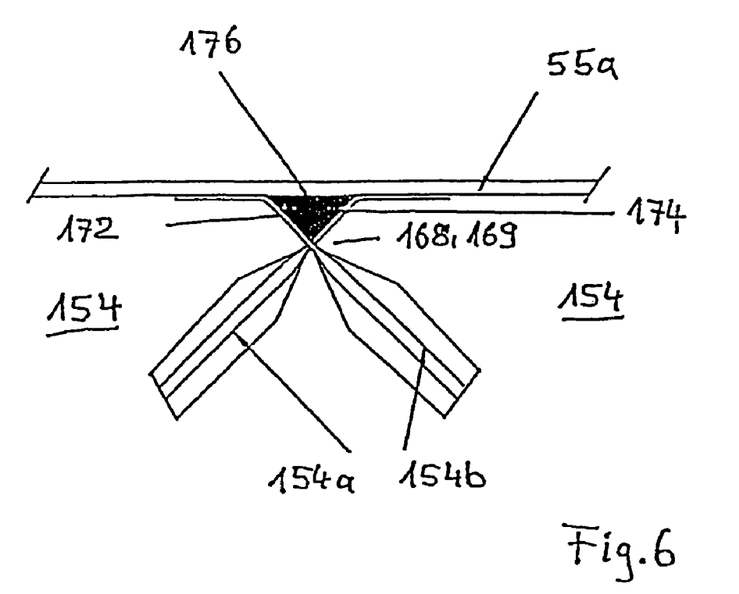
FIG. 6 an enlarged illustration that shows an embodiment of a jointed connection between the mentioned box elements and the first cover skin of the lifting wing according to the FIG. 5.
Figure 7:
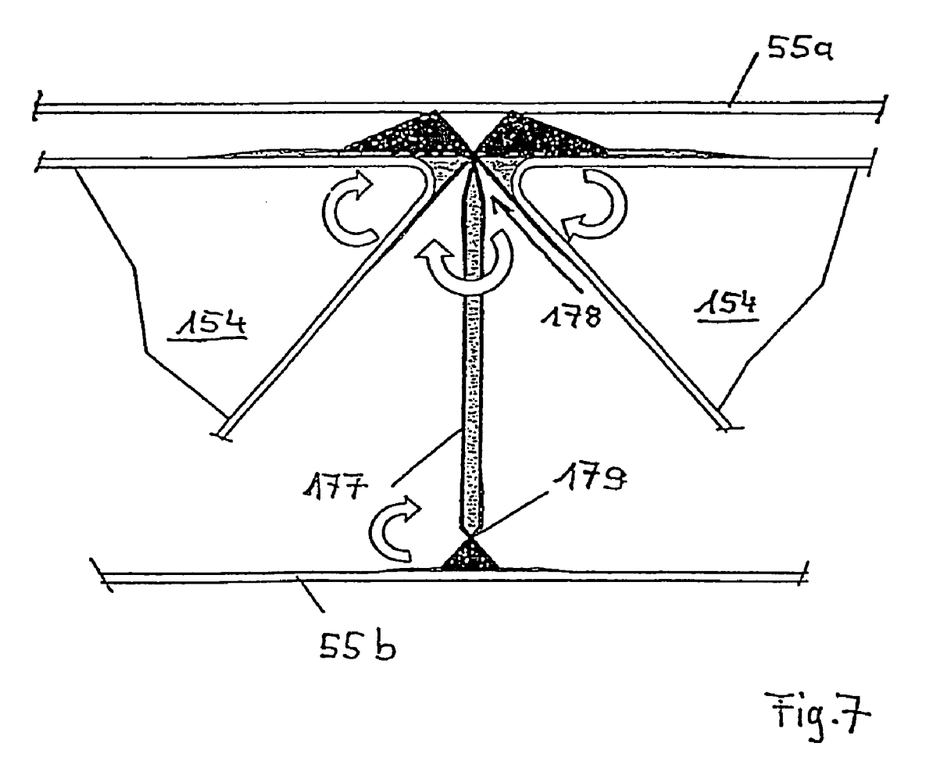
FIG. 7 an enlarged sectional view that shows a detail of a wing construction according to a different example embodiment of the invention.

As shown by FIGS. 6 and 7, which illustrate enlarged sections or portions of the region, in which the box elements 154 are coupled with one another on their longitudinal sides, and on the other hand with the first cover skin 55*a* of the lifting wing 1, the joint regions 169 and the pendulum or pivot joints 168 are formed by elastic joint elements in the illustrated example embodiments. These elastic joint elements comprise flexibly elastic bands, for example of a spring elastic metal or synthetic plastic, whereby the joint regions 169 and the pendulum or pivot joints 168 are formed by a common element in the illustrated example embodiments. These common elements 168, 169 are formed by flexibly elastic bands 172, 174 that respectively extend in extension of the shanks or legs 154*a*, 154*b* of the triangle shaped box elements 154, are fixed or secured thereto on one side, and cross one another, of which the other side is fixed or secured to the first cover skin 55*a* of the wing 1. In the space bounded by the flexibly elastic bands 172, 174 crossing one another and the first cover skin 55*a*, there is provided a filler piece 176, which especially consists of an elastic material, compare FIG. 6.

In the example embodiment illustrated in FIG. 7, there is further provided a web or spar element 177, which extends in the direction from the first cover skin 55*a* to the second cover skin 55*b*, and which extends with its longitudinal direction parallel to the longitudinal direction of the box elements 154. This web or spar element 177 is fixed or secured with one side to the first cover skin 55*a* or near the same on the side of the box elements 154 via a first articulated or jointed connection 178, in the example embodiment illustrated here, on the common joint formed by the joint region 169 and the pendulum or pivot joint 168, and with the other side lying opposite, to the second cover skin 55b, via a second articulated or jointed connection 179. The first articulated or jointed connection 178 and the second articulated or jointed connection 179 are formed by elastic bands.

Figure 8:
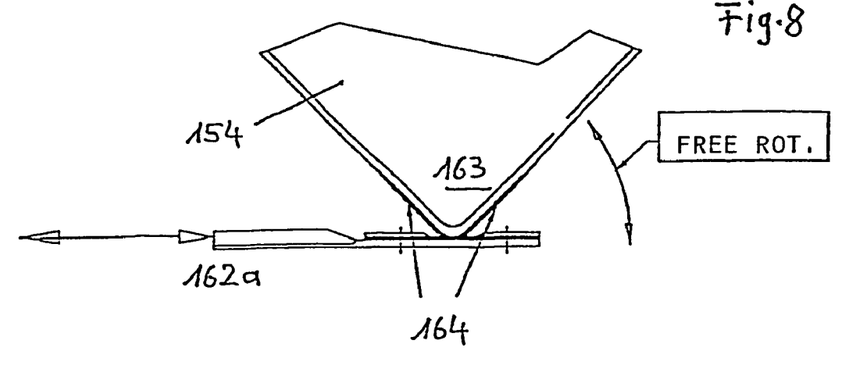
FIG. 8 a schematic enlarged sectional view of a detail of a drive for adjusting the flexible wing region.

As shown by FIG. 8, the drive line 162a is coupled via an elastic band 164 (forming a transmission region) with the connection region 163 of the box elements 154.

Figure 9:
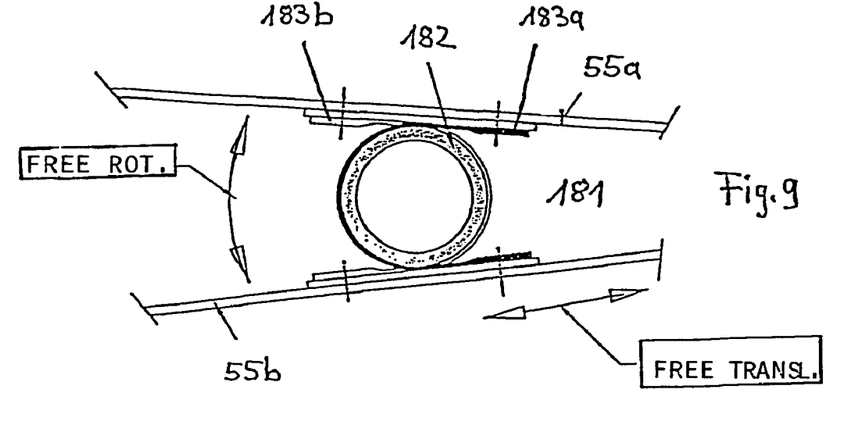
FIGS. 9 and 10 sectional views of spacers or spacing holders, which hold the first cover skin and the second cover skin of a lifting wing at a prescribed spacing distance, and simultaneously allow a relative sliding displacement of the two in a prescribed direction.
Figure 10:
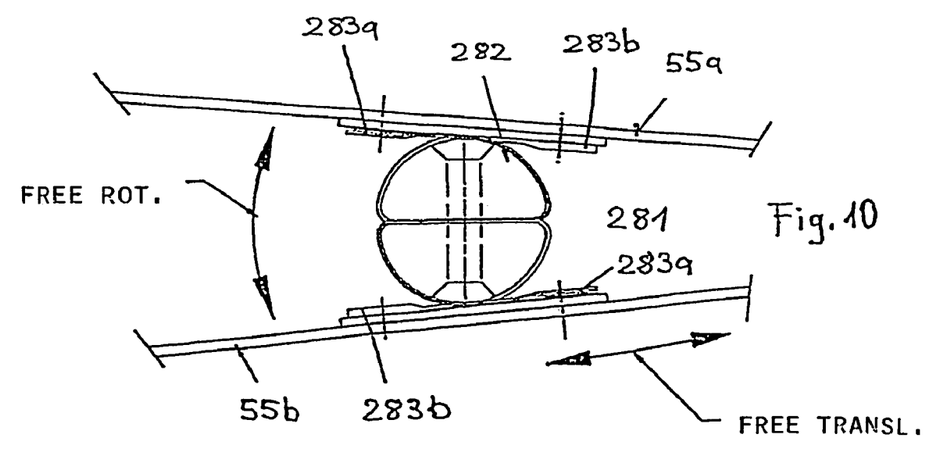

The FIGS. 9 and 10 show cross-sectional views of spacers or spacing holders 181; 281, which are provided between the first cover skin 55a and the second cover skin 55b, by means of which the cover skins 55a, 55b are held at a prescribed spacing distance and simultaneously a relative motion between these is made possible upon changing of the wing profile.

The spacing holders 181; 281 comprise a roll or drum shaped element 182; 282 and an arrangement of flexible bands 183a, b; 283a, b, through which the roll or drum shaped elements 182; 282 are guided in the sense of a rolling motion between the first cover skin 55a and the second cover skin 55b in connection with a relative motion between these. The flexible bands 183a, b; 283a, b are guided around the roll or drum shaped elements 182; 282 and are secured with their ends on the first cover skin 55a or the second cover skin 55b respectively.

In the example embodiment illustrated in FIG. 9, the flexible band 183a is secured to the first cover skin 55a on the right side of the roll or drum shaped element 182, and is guided around the roll or drum shaped element 182 again back to its right side and is secured to the second cover skin 55b. In a mirror-opposite manner thereto, a further flexible band 183b is secured to the first cover skin 55a on the left side of the roll or drum shaped element 182, guided around the roll or drum shaped element 182 again to its left side and secured to the second cover skin 55b. Thereby, a rolling motion of the roll or drum shaped element 182 between the first cover skin 55a and the second cover skin 55b is possible, and simultaneously the former is securely guided and held.

In the example embodiment illustrated in FIG. 10, the roll or drum shaped element 282 is divided or split in the middle, and each one of the flexible bands 283a, b is guided through the middle of the roll or drum shaped element 282 while reversing the wrapping or winding direction and respectively wrapped or wound in opposite directions around the element 282. Thus, a flexible band 283a is secured to the first cover skin 55a on the left side of the roll or drum shaped element 282, guided around the roll or drum shaped element 282 and back to its left side through the middle thereof, and under reversal of the wrapping or winding direction around the same, is secured to the second cover skin 55b on the right side thereof. A further flexible band 283b is, oppositely, secured to the first cover skin 55a on the right side of the roll or drum shaped element 282, guided around the roll or drum shaped element 282 and back through the middle thereof, and under reversal of the wrapping or winding direction is guided further around the roll or drum shaped element 282 and secured on its left side. Here also, the flexible bands 283a, b allow a relative motion of the cover skins 55a, 55b relative to one another, whereby the roll or drum shaped element 282 is securely guided and held with a rolling motion between the cover skins 55a, 55b.

The invention claimed is:

1. A wing with a changeable wing profile, wherein the wing is bounded by a wing leading edge, a wing trailing edge, and a wing outboard end edge that extends in a wing chord direction from the wing leading edge to the wing trailing edge, and wherein the wing comprises a leading edge region along the wing leading edge and a trailing edge region along the wing trailing edge opposite one another with respect to a wing chord direction, a first cover skin and a second cover skin spaced apart from one another by spars therebetween, a wing tip region that is arranged at an outboard end of the wing with respect to a wingspan direction and that is bounded by the wing outboard end edge and the wing trailing edge, and a flexible region by which the wing tip region is connected with a main wing body of the wing and by which the wing profile of the flexible region is adjustable by changing a curvature or camber thereof about at least one curvature axis extending essentially perpendicularly to the leading edge region and obliquely non-parallel relative to the wing chord direction in a direction that includes both a first component in the wing chord direction and a second component in the wingspan direction, characterized in that the flexible region comprises several longitudinally extending torsion boxes that are arranged next to one another and that are each respectively formed of the first cover skin, the second cover skin and at least one of the spars, and further comprising an adjusting mechanism adapted to change a shape of the torsion boxes and therewith change the curvature or camber of the wing profile of the flexible region in response to a corresponding control signal, wherein the wing tip region comprises an end piece arranged and adapted to permit a compensation of a mutual relative sliding displacement of the first cover skin relative to the second cover skin with the change of the curvature or camber of the flexible region due to the change of the shape of the torsion boxes, wherein the flexible region extends from the leading edge region to the trailing edge region of the wing and between the main wing body and the wing tip region, and wherein the leading edge region extends with a positive oblique sweepback angle relative to the wing chord direction, and the flexible region is arranged with the spars thereof extending longitudinally essentially perpendicularly to the leading edge region, and angled obliquely non-parallel to the wing outboard end edge and the wing chord direction.

2. The wing according to claim 1, characterized in that the second cover skin is slidably supported against the end piece, and further comprising a fastening arrangement by which the second cover skin is held onto the end piece while allowing a sliding displacement of the second cover skin relative to the end piece.

3. The wing according claim 1, characterized in that, in the flexible region the camber of the wing is adjustable while changing the curvature of the first cover skin and of the second cover skin.

4. The wing according to claim 1, characterized in that the adjusting mechanism comprises at least one vertebra body with a transmission element that is connected via a pivot joint with the first cover skin, and that is connected via a connection location to a drive line which has a length that is changeable in response to the control signal, wherein the connection location is vertically spaced apart from the pivot joint, and due to a change of the length of the drive line the drive line is adapted to cause a rotation of the at least one vertebra body so as to cause a change of the shape of the torsion boxes and therewith of the wing profile.

5. The wing according to claim 4, characterized in that the at least one vertebra body comprises several vertebra bodies arranged one behind another, and all of the vertebra bodies are connected respectively with the one drive line.

6. The wing according to claim 4, characterized in that the at least one vertebra body and the at least one drive line are arranged within the torsion boxes.

7. The wing according to claim 4, characterized in that the at least one vertebra body and the at least one drive line are arranged outside of the torsion boxes.

8. The wing according to claim 4, characterized in that the pivot joint is an elastic joint, by which each said transmission element is connected via elastic connections with the first cover skin and with a respective one of the spars.

9. The wing according to claim 1, characterized in that the flexible region comprises box elements elongated in a longitudinal direction and forming the torsion boxes, which are jointedly connected to one another on their longitudinal sides in a prescribed degree via joint regions and are provided between the first cover skin and the second cover skin, whereby the box elements each respectively comprise a transmission region extending perpendicularly to the longitudinal direction of the box element and connected with the first cover skin, and a connection region spaced apart from the transmission region in a vertical direction, and wherein the adjusting mechanism is coupled with the respective connection region of the respective box elements and is adapted to move the box elements about the joint regions thereby causing a change of the wing profile in response to the corresponding control signal.

10. The wing according to claim 9, characterized in that the box elements each respectively have an essentially triangular basic shape in cross-section, whereby the transmission region is formed by a baseline of the triangular basic shape and the connection region is formed by a corner point of the triangular basic shape lying opposite the baseline.

11. The wing according to claim 9, characterized in that the adjusting mechanism comprises a drive line which has a length that is changeable and which is coupled with the connection regions of the box elements, and due to a change of the length of the drive line the drive line is adapted to cause a rotation of the box elements so as to cause a change of the shape of the wing profile.

12. The wing according to claim 9, characterized in that the box elements are arranged one behind another, and are respectively coupled with a drive line.

13. The wing according to claim 9, further comprising pivot joints that are arranged and adapted to permit and compensate a relative motion between the first cover skin and the box elements, and that couple the transmission regions of the box elements with the first cover skin.

14. The wing according to claim 13, characterized in that at least one of the joint regions or the pivot joints comprise elastic joint elements.

15. The wing according to claim 13, characterized in that at least one of the joint regions or the pivot joints comprise flexibly elastic bands.

16. The wing according to claim 13, characterized in that the joint regions and the pivot joints are respectively incorporated together in respective common joints.

17. The wing according to claim 16, characterized in that each one of the common joints respectively comprises flexibly elastic bands that respectively extend in extension of shanks of the box elements, and that are secured at a first end thereof to the box elements at one side thereof, and that cross over one another, and wherein a second end of the flexibly elastic bands is secured on the first cover skin of the wing.

18. The wing according to claim 17, further comprising a filler piece consisting of an elastic material provided in a space bounded by the first cover skin and the flexibly elastic bands that cross one another.

19. The wing according to claim 9, wherein a respective one of the spars of the flexible region respectively comprises a spar element extending in a direction from the first cover skin to the second cover skin and extending with a longitudinal extension direction of the spar element parallel to the longitudinal direction of the box elements, and wherein a first end of the spar element is secured via a first jointed connection directly or indirectly to the first cover skin and a second end of the spar element opposite the first end is connected via a second jointed connection directly or indirectly to the second cover skin.

20. The wing according to claim 19, characterized in that at least one of the first jointed connection or the second jointed connection comprises elastic bands.

21. The wing according to claim 9, further comprising an elastic band that couples the drive line with the connection region of a respective one of the box elements.

22. The wing according to claim 9, further comprising a spacing holder provided between the first cover skin and the second cover skin, by which spacing holder the cover skins are held at a prescribed spacing distance apart from one another and a relative motion between the cover skins is permitted with changing of the wing profile.

23. The wing according to claim 22, characterized in that the spacing holder includes a roll shaped element and a flexible band arrangement that is arranged and adapted to guide a rolling motion of the roll shaped element between the first cover skin and the second cover skin with a relative motion between the first and second cover skins.

24. The wing according to claim 23, characterized in that the flexible band arrangement includes at least one flexible band that is guided around the roll shaped element and that has first and second ends thereof secured on the first or second cover skin respectively.

25. The wing according to claim 24, characterized in that the roll shaped element is centrally divided by a central passage, and in that the flexible band extends through the central passage of the roll shaped element and while reversing a wrapping direction the flexible band is wrapped around the roll shaped element respectively halfway in opposite directions.

26. A wing comprising:
   a leading edge, a trailing edge, and an outboard end edge that extends in a wing chord direction from said leading edge to said trailing edge;
   a wing body bounded between said leading edge and said trailing edge, wherein said wing body includes a leading edge portion along said leading edge, a trailing edge portion along said trailing edge, and a main wing body portion between said leading edge portion and said trailing edge portion;
   a wing tip portion forming an outboard end of said wing in a wingspan direction, wherein said wing tip portion is bounded by said trailing edge and by said outboard end edge; and
   a flexible wing portion interposed between and connecting said wing tip portion and said main wing body portion, and extending from said leading edge portion to said trailing edge portion;
   wherein:
   said leading edge extends with a positive oblique sweepback angle relative to said wing chord direction;

said flexible wing portion comprises a flexible top cover skin, a flexible bottom cover skin spaced apart from said top cover skin, plural spars that extend longitudinally parallel to one another, perpendicular to said leading edge and angled obliquely non-parallel to said outboard end edge and said wing chord direction in a space between said top and bottom cover skins, and plural vertebral adjusting mechanisms that each respectively extend longitudinally in a longitudinal direction parallel to said leading edge and perpendicular to said spars;

each one of said vertebral adjusting mechanisms comprises plural vertebra bodies that are respectively interposed between successive ones of said spars in said longitudinal direction and that are pivotably connected to one another and to said spars, and a drive line that has an actuator-driven variable length in said longitudinal direction and that is connected to said vertebra bodies, so that said vertebra bodies are respectively adapted to pivot about pivot axes extending perpendicular to said leading edge in response to a change of said variable length of said drive line whereby a camber of said flexible wing portion is variable about at least one curvature axis extending perpendicular to said leading edge and obliquely non-parallel relative to said wing chord direction, in a direction that includes a first component in said wing chord direction and a second component in said wingspan direction.

27. The wing according to claim 26, wherein said wing tip portion has a triangular plan shape bounded by said outboard end edge, said trailing edge and said flexible wing portion, and not extending along said leading edge.

28. The wing according to claim 26, wherein said spars extend longitudinally obliquely non-parallel and non-perpendicular to said trailing edge, and said at least one curvature axis extends obliquely non-parallel and non-perpendicular to said trailing edge.

* * * * *